United States Patent
Haga (10) Patent No.: US 7,536,128 B2
(45) Date of Patent: May 19, 2009

(54) IMAGE FORMING SYSTEM INCLUDING AN IMAGE FORMING APPARATUS WHICH FORMS AN IMAGE BASED ON A REMOTELY EDITABLE JOB TICKET, AND CONTROL METHOD FOR IMAGE FORMING SYSTEM

(75) Inventor: Tatsuyoshi Haga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 470 days.

(21) Appl. No.: 10/946,591

(22) Filed: Sep. 21, 2004

(65) Prior Publication Data
US 2005/0146751 A1    Jul. 7, 2005

(30) Foreign Application Priority Data
Jan. 5, 2004    (JP)    ............... 2004-000397

(51) Int. Cl.
G03G 15/00    (2006.01)
(52) U.S. Cl. .................................... 399/82
(58) Field of Classification Search .............. 399/82
See application file for complete search history.

(56) References Cited

U.S. PATENT DOCUMENTS

| | | | | |
|---|---|---|---|---|
| 5,718,520 | A * | 2/1998 | MacKay | ............... 400/61 |
| 2001/0000027 | A1 * | 3/2001 | Collard et al. | ............... 399/398 |
| 2002/0131069 | A1 * | 9/2002 | Wanda | ............... 358/1.14 |
| 2002/0136559 | A1 * | 9/2002 | Simpson et al. | ............... 399/9 |
| 2003/0044194 | A1 * | 3/2003 | Bodine et al. | ............... 399/82 |
| 2003/0202213 | A1 * | 10/2003 | Saito | ............... 358/1.18 |
| 2004/0036916 | A1 * | 2/2004 | Yamaguchi | ............... 358/1.18 |
| 2004/0111675 | A1 * | 6/2004 | Mori et al. | ............... 715/513 |
| 2004/0268352 | A1 * | 12/2004 | Honma | ............... 718/100 |
| 2005/0050466 | A1 * | 3/2005 | Sangroniz et al. | ............... 715/526 |
| 2005/0146751 | A1 * | 7/2005 | Haga | ............... 358/1.18 |

FOREIGN PATENT DOCUMENTS

| | | | | |
|---|---|---|---|---|
| JP | 11136528 | A | * | 5/1999 |
| JP | 2000250722 | A | * | 9/2000 |
| JP | 2000-357072 | A | | 12/2000 |
| JP | 2001-306204 | A | | 11/2001 |
| JP | 2002-281195 | A | | 9/2002 |

OTHER PUBLICATIONS

Computer translation of jp2002-281195a.*

* cited by examiner

Primary Examiner—Quana M Grainger
(74) Attorney, Agent, or Firm—Frishauf, Holtz, Goodman & Chick, P.C.

(57) ABSTRACT

An image forming system having: an image forming apparatus for forming an image base on a job ticket; a remote operation apparatus for remotely operating the image forming apparatus via a network; and a controller for editing the job ticket according to a request from the remote operation apparatus, for generating a template image corresponding to an image forming processing based on the job ticket, which having been edited, and for controlling to display the template image.

2 Claims, 8 Drawing Sheets

IMAGE FORMING SYSTEM INCLUDING AN IMAGE FORMING APPARATUS WHICH FORMS AN IMAGE BASED ON A REMOTELY EDITABLE JOB TICKET, AND CONTROL METHOD FOR IMAGE FORMING SYSTEM

BACKGROUND OF THE INVENTION

The present invention relates to an image forming apparatus, and to an image forming system having a remote control apparatus that operates remotely said image forming apparatus via a communication network.

In recent years, various proposals have been made for image forming systems comprising image forming apparatus such as copiers that form and output images on recording media such as paper, etc., and remote control apparatuses such as PCs (personal computers) that carry out remote operation of said image forming apparatus via communication networks.

In said image forming apparatus, image forming jobs are edited and executed based on the different processing requests input either from the operation section on the chassis of the image forming apparatus or through said remote control apparatus. (See patent documents 1, 2, and 3.)

Here, said image forming job is the control data that includes the image data that is to be output, and the job ticket corresponding to that image data, and a job ticket is the data stipulating the output conditions at the time of outputting the image data, such as single side or both side printing, presence or absence of punches or staples, paper selection, magnification, number of copies output, etc., and is the data indicating the operation instructions at the time of executing the job.

Patent document 1: Japanese patent application disclosure No. 2000-357072

Patent document 2: Japanese patent application disclosure No. 2001-306204

Patent document 3: Japanese patent application disclosure No. 2000-281195

However, the following problems were present in the conventional technology described above.

That is to say, since it is difficult for the user editing a job ticket of the image forming apparatus from the remote control apparatus to verify the result of the final output, the user will find it very inconvenient because the user will have to edit the job ticket while predicting the output result in one's own mind.

In addition, in the case when the user actually makes the image forming apparatus execute the job and then directly confirms the final output result, in spite of carrying out remote operation, the user will have to actually go to the place where the image forming apparatus is located, and this is both cumbersome and laborious if the user and the image forming apparatus are in different buildings or different floors of a building. In addition, in this case, it is also uneconomical because of increased cost and wasteful use of resources.

The purpose of the present invention is to make it possible to confirm easily, from the remote control apparatus, the result of the final output from the image forming apparatus in an image forming system comprising an image forming apparatus that forms and outputs images on recording media such as paper, etc., and a remote control apparatus that carries out remote operation of said image forming apparatus via communication networks.

SUMMARY OF THE INVENTION

The above problem can be solved by the present invention having the following features.

(1) An image forming system including: an image forming apparatus for forming an image base on a job ticket; a remote operation apparatus for remotely operating the image forming apparatus via a network; and a controller for editing the job ticket according to a request from the remote operation apparatus, for generating a template image corresponding to an image forming processing based on the job ticket, which having been edited, and for controlling to display the template image.

(2) The image forming system of item (1), wherein the image forming apparatus includes an image processing section for generating a thumbnail based on image data, and the controller generates the template image based on the thumbnail generated.

(3) The image forming system of item (1), wherein the remote operation apparatus includes an image processing section for generating a thumbnail based on image data, and the controller generates the template image based on the thumbnail generated.

(4) A control method for controlling an image forming system having a remote operation apparatus connected to a network and an image forming apparatus which being remote operated by the remote operation apparatus via a network, the control method including: forming an image based on a job ticket; editing a content of the job ticket according to a request from the remote operation apparatus; and controlling to generate a template image corresponding to an image forming processing based on the job ticket, which having been edited, and to display the template image.

(5) An image forming system having: an image forming apparatus for forming an image base on a job ticket; and a remote operation apparatus for providing an operation request to the image forming apparatus, the image forming apparatus and the remote operating apparatus being configured to be capable of data communication with each other via a network, wherein the image forming system further having: a reception section for receiving the operation request from the remote operation apparatus; an editing section for editing a content of the job ticket according to the operation request received; and a template generating section for generating a template image corresponding to an image forming processing based on the job ticket, which having been edited.

According to the present invention, the user editing a job-ticket of the image forming apparatus from the remote control apparatus can easily verify the result of the final output by referring to the output result template image displayed in the job ticket editing screen, the user will not have to predict in one's own mind the output result nor will have to directly confirm the final output result by actually executing the job in the image forming apparatus.

DETAILED DESCRIPTION OF THE PREFERRED EMBODIMENTS

In the following, the image forming system 100 according to the preferred embodiments of the present invention is described by referring to the drawings. However, the intent and scope of the present invention shall not be construed to be limited to the examples described here.

First Preferred Embodiment

Figure 1:
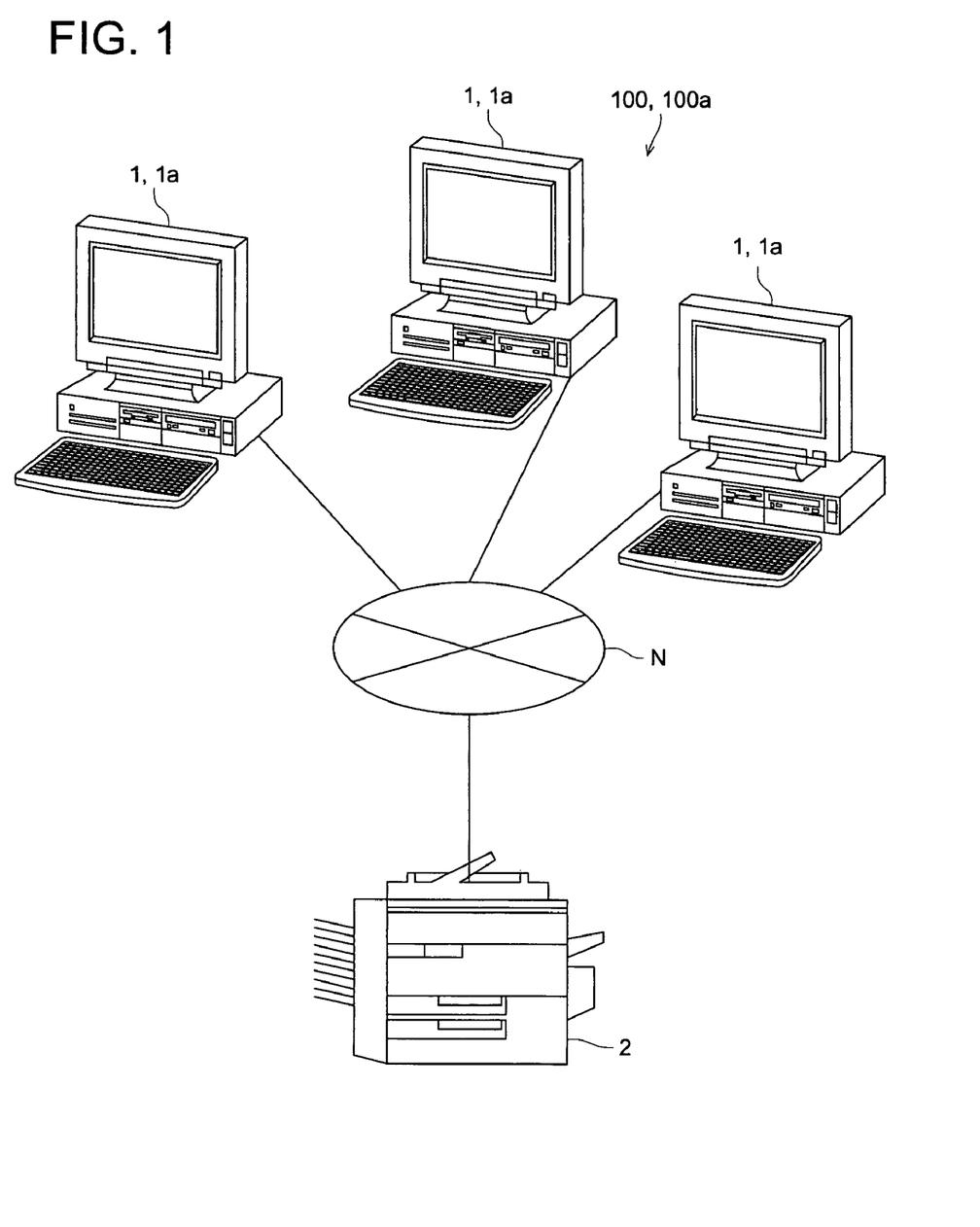
FIG. 1 is a figure showing the configuration of an image forming system according to the present invention.

Referring to the drawings, the image forming system 100 according to the present invention is described here. As is shown in FIG. 1, the image forming system 100 comprises plural remote control apparatuses 1 and an image forming apparatus 2, all of which are interconnected via the network N. The image forming apparatus 2 receives from remote control apparatuses different operation instructions such as request for job list or request for job ticket editing, etc., and is remotely operated by these instructions.

Although, for example, a LAN (Local Area Network) is presumed as the network N, the configuration can without any prejudice include WANs (Wide Area Networks), the internet, telephone circuit networks, ISDN (Integrated Services Digital Network) circuit network, DSL (Digital Subscriber Line) circuit networks (including ADSL (Asymmetric Digital Subscriber Line) circuit networks), mobile communication networks, communication satellite circuits, CATV communication circuits, optical communication circuits, wireless communication circuits, etc.

Firstly, the configuration of a remote control apparatus 1 is described here.

Figure 2:
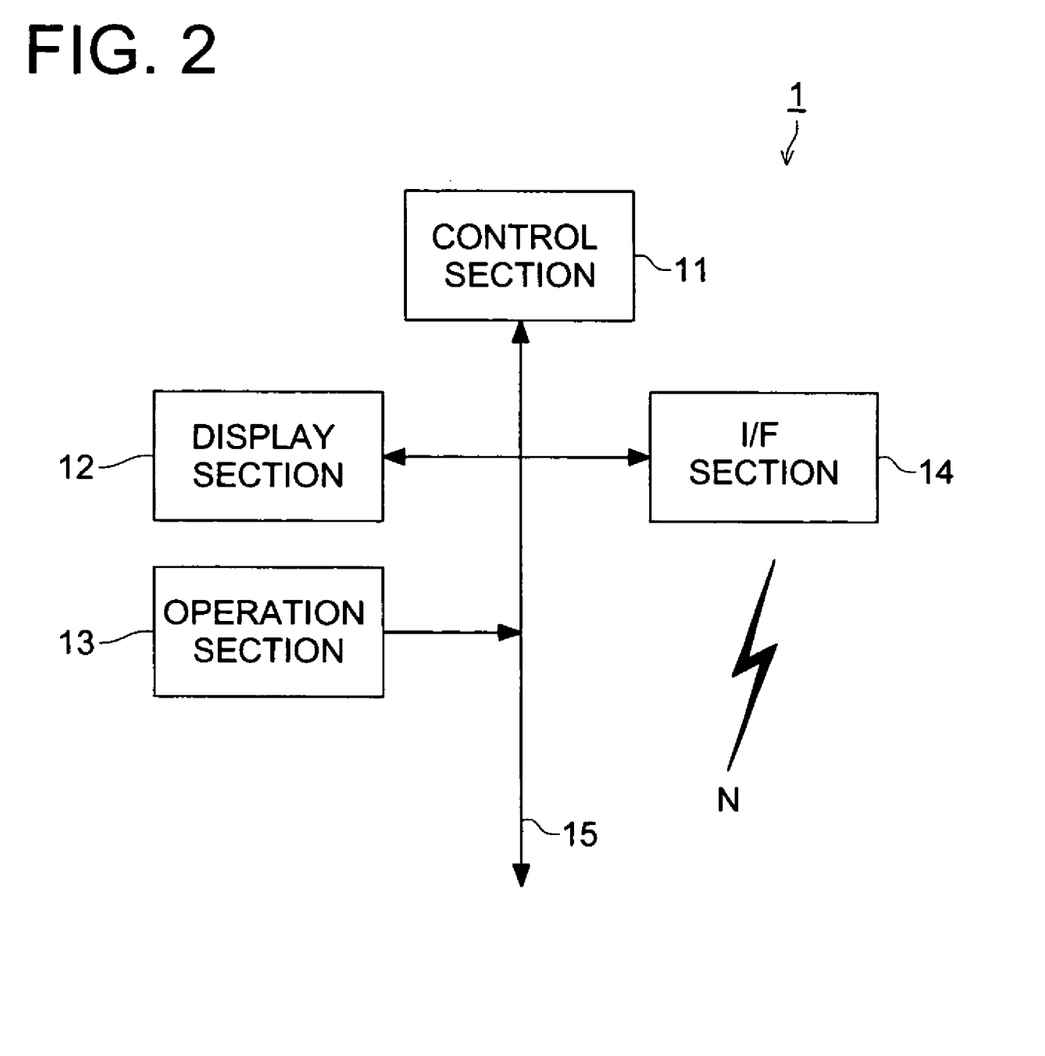
FIG. 2 shows the block diagram of the internal configuration of the remote control apparatus shown in FIG. 1.

The remote control apparatus 1 can, for example, be a personal computer, which, as is shown in FIG. 2, comprises a control section 11, a display section 12, a operation section 13, and an I/F section 14, all of which are interconnected via the bus 15.

The control section 11 comprises a CPU (Central Processing Unit), a RAM (Random Access Memory), a ROM (Read Only Memory), etc., all of which have not been shown in the figure. The CPU uses a specific area of the RAM as its work area and executes the various programs stored in the ROM, and comprehensively controls all the operations of the remote control apparatus 1 by sending control signals to the different sections.

The display section 12 comprises a display device such as and LCD (Liquid Crystal Display), CRT (Cathode Ray Tube) display, etc., and displays various types of image data. The display section 12 displays the operation screen in order to carry out remote operation of the image forming apparatus 2. In particular, the display section 12 displays the job list (see FIG. 5) and the job ticket editing screen (see FIG. 6) for editing the job ticket of the image forming apparatus 2.

The operation section 13 is configured to include a key board having numeric keys, alphabet keys, and various types of function keys, as well as pointing devices such as a mouse or a touch panel, etc. The user operates the operation section 13 while referring to operation screen displayed in the display section 12 thereby entering various types of operation instructions to be sent to the image forming apparatus 2. In particular, the user enters the editing instructions for the job ticket of the image forming apparatus 2 via the operation section 13 while referring to the job ticket editing screen.

The I/F section 14 comprises the interface necessary for carrying out data transmission to and data reception from the image forming apparatus 2 via the network N.

Figure 3:
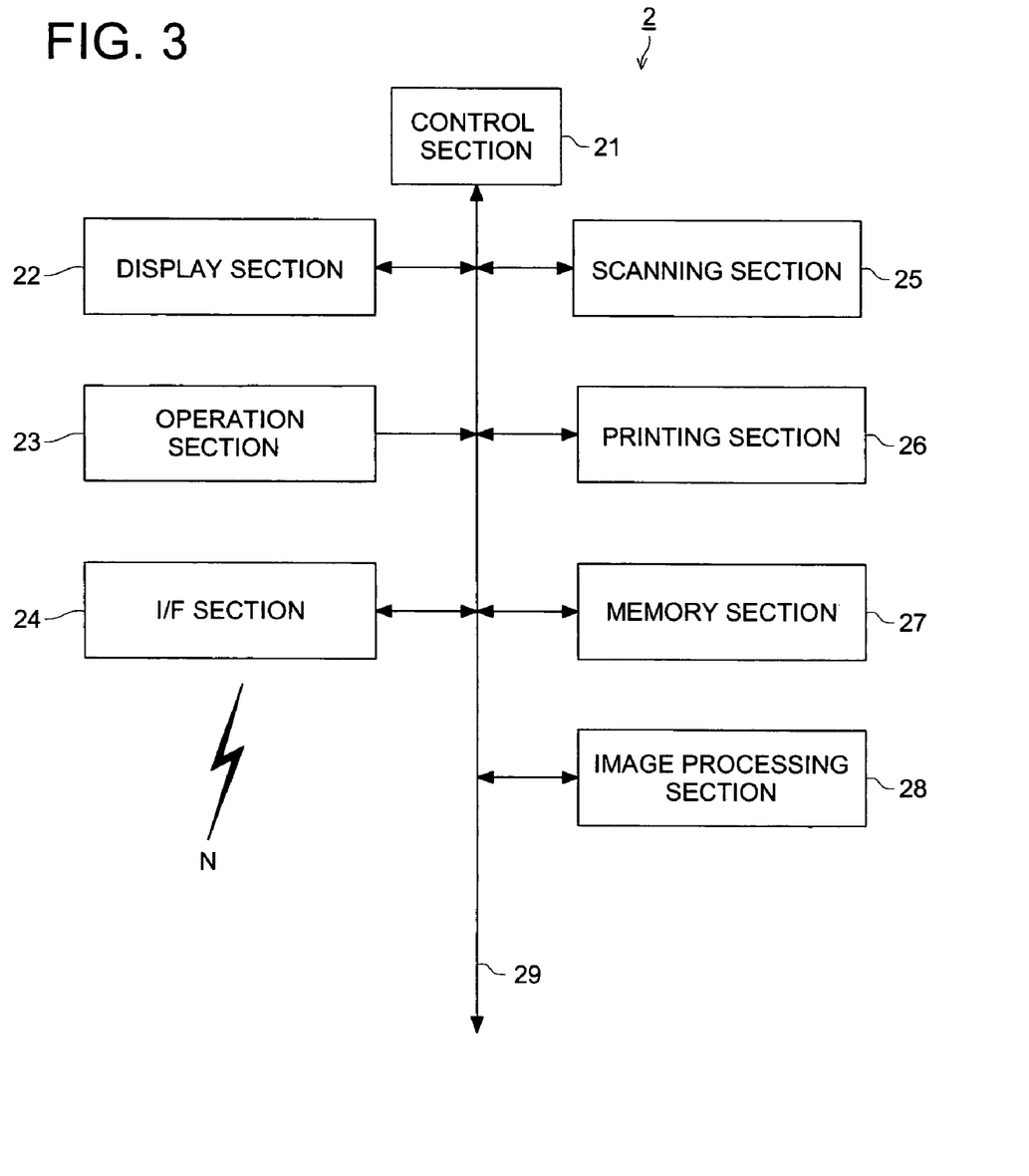
FIG. 3 shows the block diagram of the internal configuration of the image forming apparatus shown in FIG. 1.

Next, the configuration of the image forming apparatus 2 is described here by referring to FIG. 3. The image forming apparatus 2 can be a copier, a printer, a facsimile, or can be a multi-functional unit with the functions of all of these.

As is shown in FIG. 3, the image forming apparatus comprises the control section 21, the display section 22, the operation section 23, the I/F section 24, the scanner section 25, the printer section 26, the memory section 27, and the image processing section 28, and all of these sections are interconnected via the bus 29.

The control section 21 comprises a CPU (Central Processing Unit), a RAM (Random Access Memory), a ROM (Read Only Memory), etc., all of which have not been shown in the figure. The CPU uses a specific area of the RAM as its work area and executes the different programs stored in the ROM, and comprehensively controls all the operations of the image forming apparatus 1 by sending control-signals to the different sections.

The memory section 27 consists of a memory device that allows free recording, reading out, and erasing of data, and stores the image data output by the printer section 26 or the image forming job containing the job ticket corresponding to the image data.

The display section 22 comprises a display device such as and LCD (Liquid Crystal Display), etc., and displays various types of image data input from the control section 21. The display section 22 displays the operation screen containing various operation buttons.

The operation section 23 is configured using a touch panel that is integral with the display section 22, numeric keys, alphabet keys, and various types of function keys, etc., and this sections outputs the key depression signal to the control section 21 corresponding to the key that has been pressed.

The printing section 26 forms the image on recording media such as paper, etc., in an image forming method such as electro-photographic method, ink jet printing method, etc., based on the image data stored in the memory section 27 and on the job ticket, and further carries out post-processing such as stapling, hole punching, insertion, etc., of the recording media after said image forming.

The scanning section 25 comprises a light source, CCD (Charge-Coupled Device), drive circuits, etc., under the contact glass (all of these have not been shown in the figures), and gathers image data from the document placed on the contact glass.

The image processing section 28 carries out signal processing on the various types of image data that have been input. This signal processing can be, for example, encoding compression or expanding decoding, image enlargement, reduction, or rotation operations, etc. The image processing section 28 prepares the thumbnail image through this image processing by carrying out compression or expansion of image data.

The I/F section 24 comprises the interfaces necessary for carrying-out transmission and reception of data to and from remote control apparatus 1 via the network N.

Figure 4:
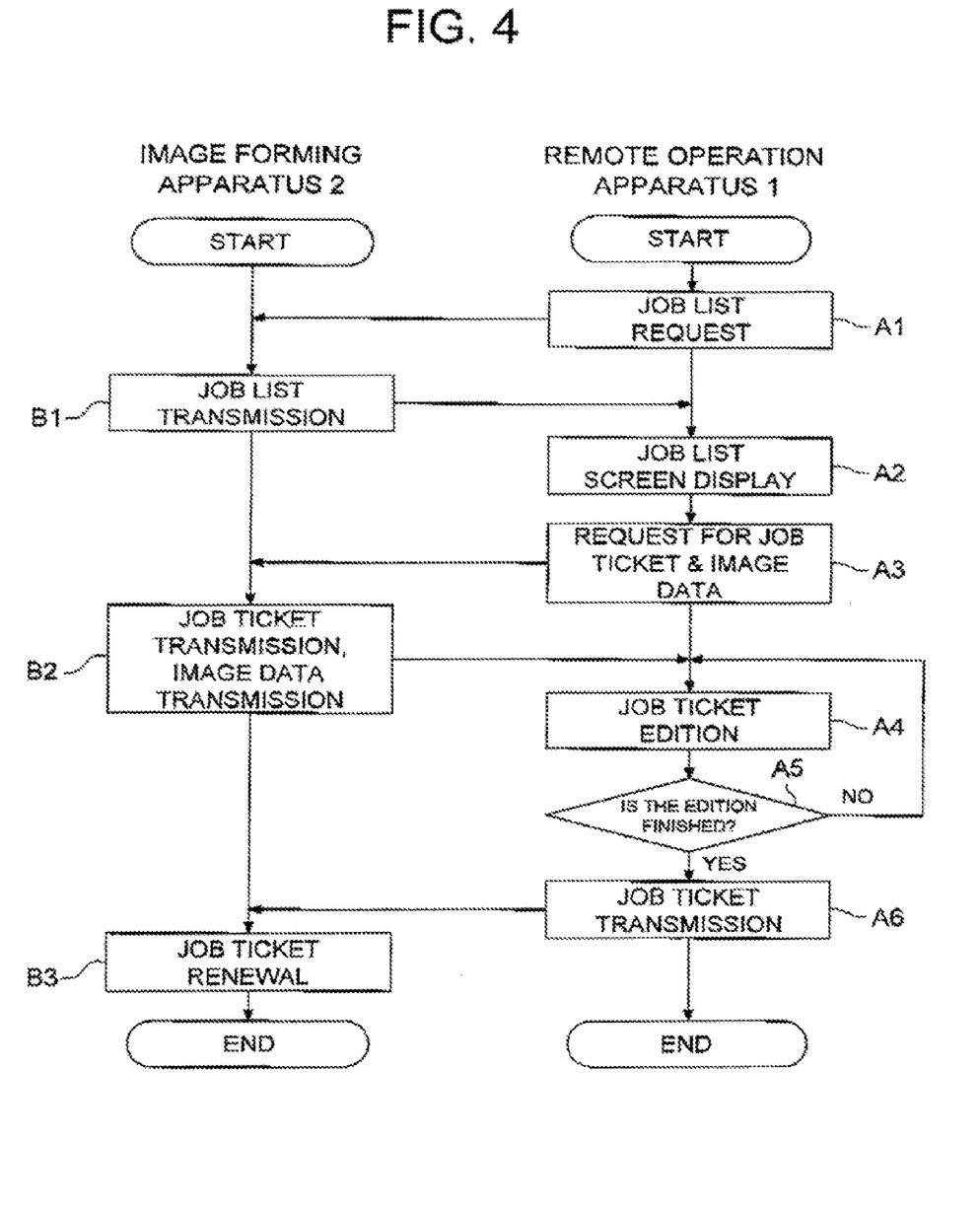
FIG. 4 is a figure showing a flowchart describing the job ticket editing operations in the first preferred embodiment of the present invention.

Next, the job ticket editing operations of the image forming system 100 is explained here by referring to the flow chart shown in FIG. 4.

The job ticket editing operations described here consist of the different operations of steps A1 to A6 carried out by the control section 11 of the remote control equipment 1 and the steps B1 to B3 carried out by the control section 21 of the image forming apparatus 2.

Firstly, in the remote control apparatus 1, the instruction of job list request is received from the user via the operation section 13 and that job list request is transmitted to the image forming apparatus 2 (Step A1).

In the image forming apparatus 2, in answer to the above job list request sent from the remote control apparatus 1, a job list of the image forming jobs stored in the memory section 27 is prepared, and this job list is transmitted to the remote control apparatus 1 (Step B1).

After Step B1, in the remote control apparatus 1, the above job list received from the image forming apparatus 2 is displayed (Step A2) in the display section 12 and the user is prompted to enter the selection of the image-forming job.

Figure 5:
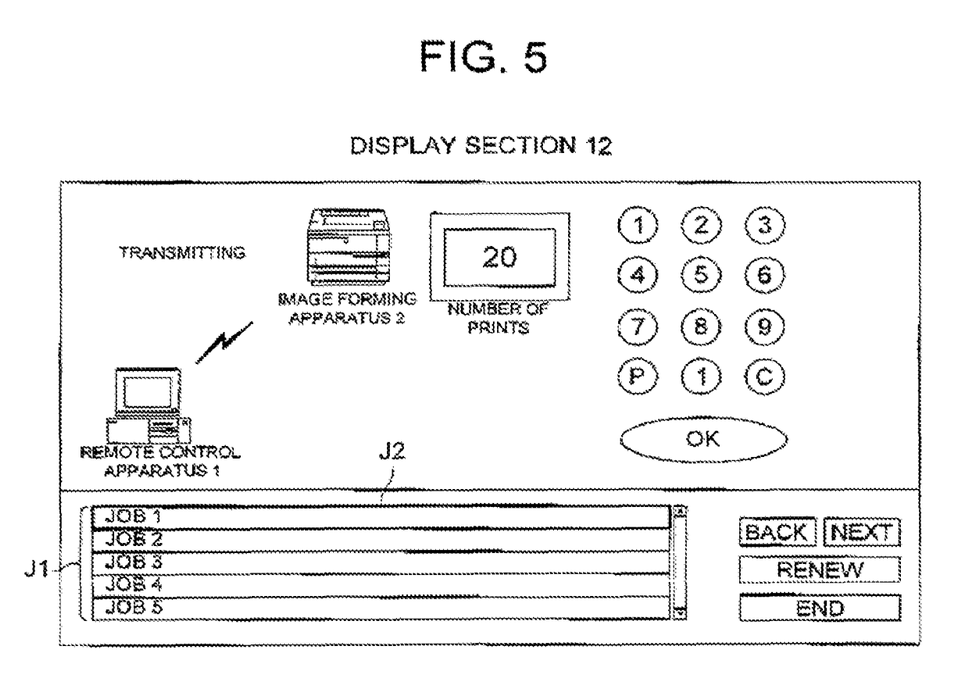
FIG. 5 is an example of the job list displayed in the display section of the remote control apparatus shown in FIG. 1.
Figure 6A:
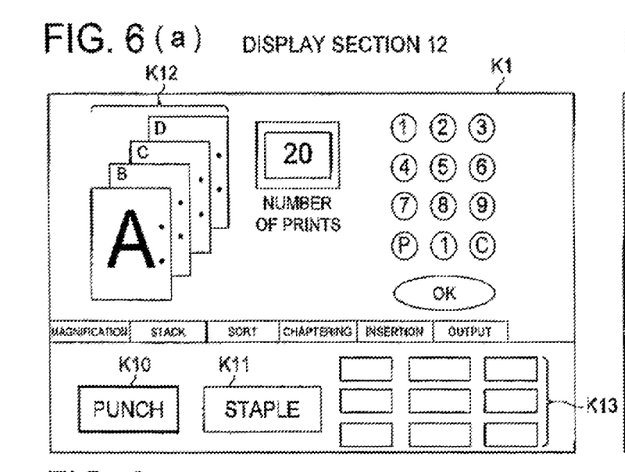
FIG. 6(a) is an example of the display made in the job editing screen (punch hole selection) that is displayed in the display section of the remote control apparatus shown in FIG. 1.
Figure 6B:
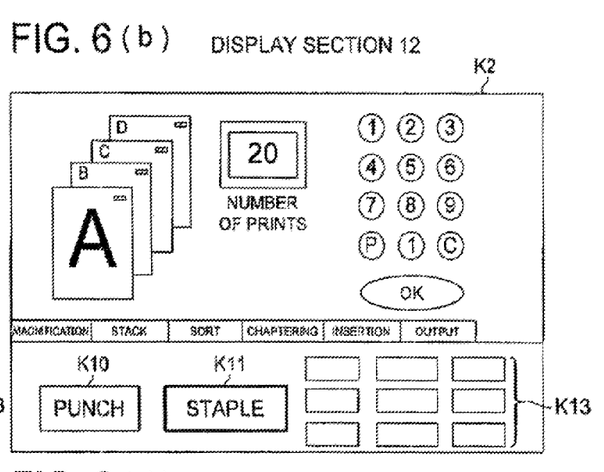
FIG. 6(b) is an example of the display made in the job editing screen (staple selection) that is displayed in the display section of the remote control apparatus shown in FIG. 1.
Figure 6C:
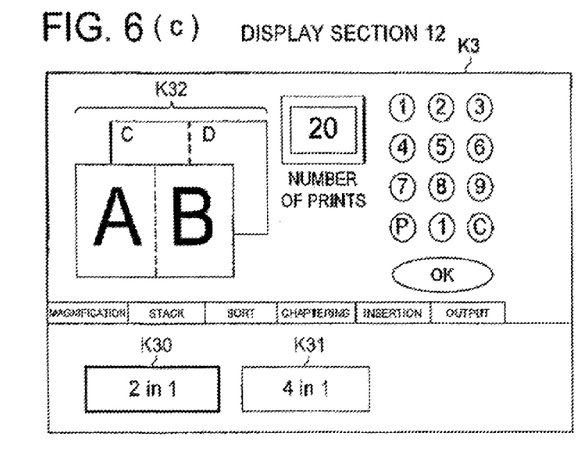
FIG. 6(c) is an example of the display made in the job editing screen (2-in-1 selection) that is displayed in the display section of the remote control apparatus shown in FIG. 1.
Figure 6D:
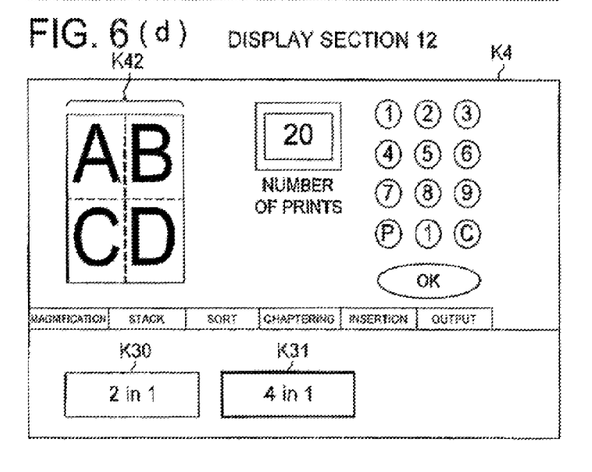
FIG. 6(d) is an example of the display made in the job editing screen (4-in-1 selection) that is displayed in the display section of the remote control apparatus shown in FIG. 1.

Here, an example of job list display is shown in FIG. 5. In this job list, in addition to the display of at least the image forming jobs from Job 1 to Job 5 that can be selected (see the contents of display indicated by the symbol J1 in the figure), the current Job 1 has been selected, and this Job 1 has been highlighted in the display (displayed in bold a line box) as shown by the symbol J2 in the figure.

Next, in the remote control apparatus 1, an instruction of requesting for the job ticket and thumbnail of the selected image forming job is transmitted to the image forming apparatus 2 (Step A3).

After Step A3, in the image forming apparatus 2, in response to the instruction from said remote control apparatus 1 of requesting for the job ticket and thumbnail, the image data of the thumbnail image corresponding to that job ticket is prepared, and this is transmitted to the remote control apparatus 1 along with the job ticket stored in the memory section 27 (Step B2).

After step B2, in the remote control apparatus 1, based on the job ticket and thumbnail sent from said image forming apparatus 1, the output result template image, which is an image illustrating a job to be output by the image forming apparatus 2, is prepared to show the final output result after post-processing is performed in accordance with the instructions of editing the job ticket input from the operation section 13, and the job ticket editing screen is displayed in the display section 12 using the so prepared output result template image (Step A4).

Here, the display examples K1 to K4 of the job ticket editing screen are shown in FIG.(a) to FIG.(d), respectively. The display example K1 shows the job ticket editing screen when punch hole settings are being made and the display example K2 shows the job ticket editing screen when stapling settings being made. Further, the display example K3 shows the job ticket editing screen when the 2-in-1 setting (setting 2 columns) is being made and the display example K4 shows the job ticket editing screen when the 4-in-1 setting (setting 4 columns) is being made.

In the different display examples K1 to K4 of the job ticket editing screen, the setting buttons K10, K11, K30, and K31 are provided corresponding to the different parameter settings (punch hole, stapling, 2-in-1, and 4-in-1) and the output result template images K12, K22, K32, and K42 are also displayed. In addition, in the display examples K1 and K2, the specification buttons K13 are displayed for specifying the position of punch holes or staples. In either case, the display of the specification buttons that have currently been selected is highlighted (for example, displayed with bold line boxes).

Further, the display section also displays enlargement, reduction, sort, insertion, chapter separation, booklet, or other combinations of these, although they have not been shown in the figure here.

We continue the description by going back to FIG. 4. After Step A4, in the remote control apparatus 1, the judgment will be made (Step A5) of whether or not the-user has indicated the end of job ticket editing, and when the end indication has been made (Step A5: Yes), the edited job ticket and the corresponding end indication are transmitted (Step A6) to the image forming apparatus 2. In the image forming apparatus 2, the job ticket stored in the memory section 27 is updated (Step B3) based on the job ticket that has been received.

In Step A5, if indication of the end of editing has not been made (Step A5: No), the control gets transferred to Step A4 and the job ticket editing screen will be displayed again.

Second Preferred Embodiment

Referring to the drawings, the image forming system 100a according to the present invention is described here. As is shown in FIG. 1, the image forming system 100a comprises plural remote control apparatuses 1a and an image forming apparatus 2. Further, for the sake of simplification, the configuring sections of this system that are common to the image forming system 100 described already will be assigned the same numeric symbols as in the image forming system 100 and their descriptions will be omitted here, and only the remote control apparatus 1a that is the configuration section that is different from said image forming system 100 will be described below.

Figure 7:
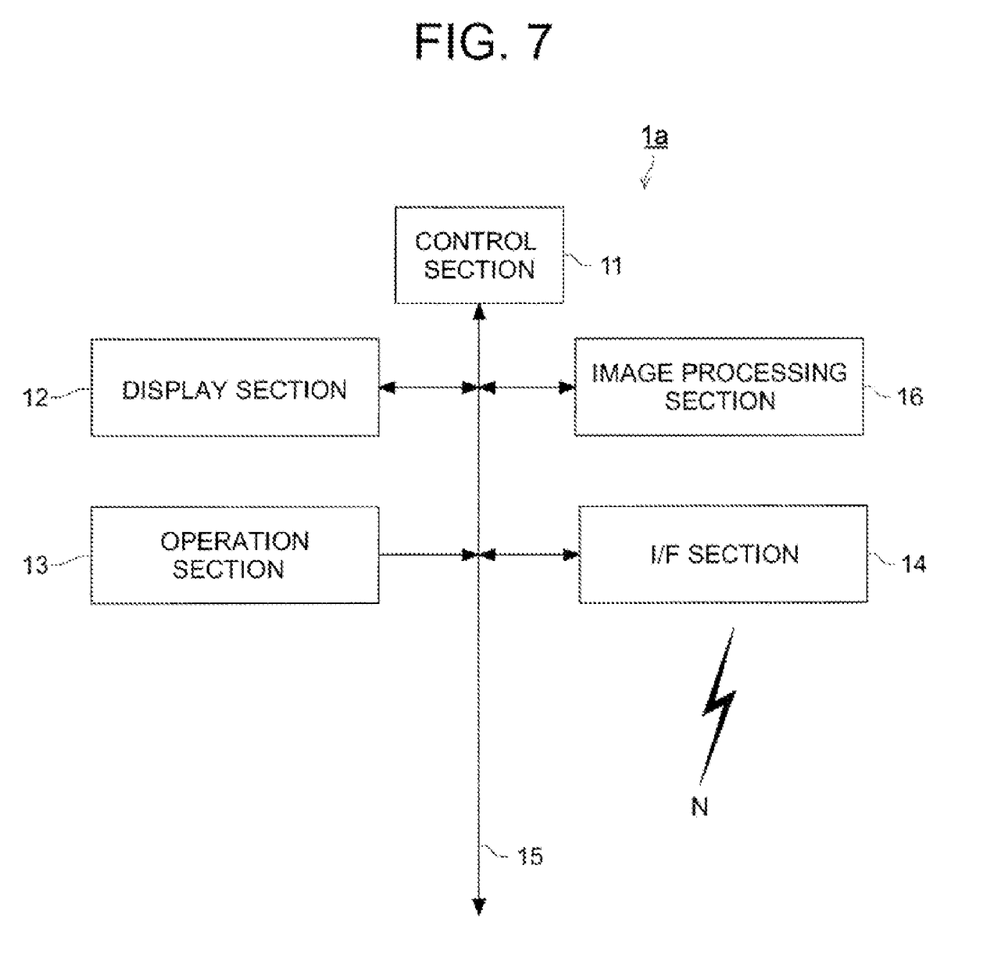
FIG. 7 is a block diagram of the internal configuration of the remote control apparatus 1a shown in FIG. 1.

The configuration of the remote control apparatus 1a is shown in FIG. 7. The remote control apparatus 1a can, for example, be a personal computer, which, as is shown in FIG. 7, comprises a control section 11, a display section 12, a operation section 13, an I/F section 14, and an image processing section 16, etc., all of which are interconnected via the bus 15.

The image processing section 16 carries out signal processing on the different types of image data that are input. This signal processing is, for example, encoding compressing or expansion decoding, enlargement, reduction, or rotation operation on the image, etc. The image processing section 16 prepares the thumbnail image by carrying out reduction and compression operations of the image data using this signal processing.

Figure 8:
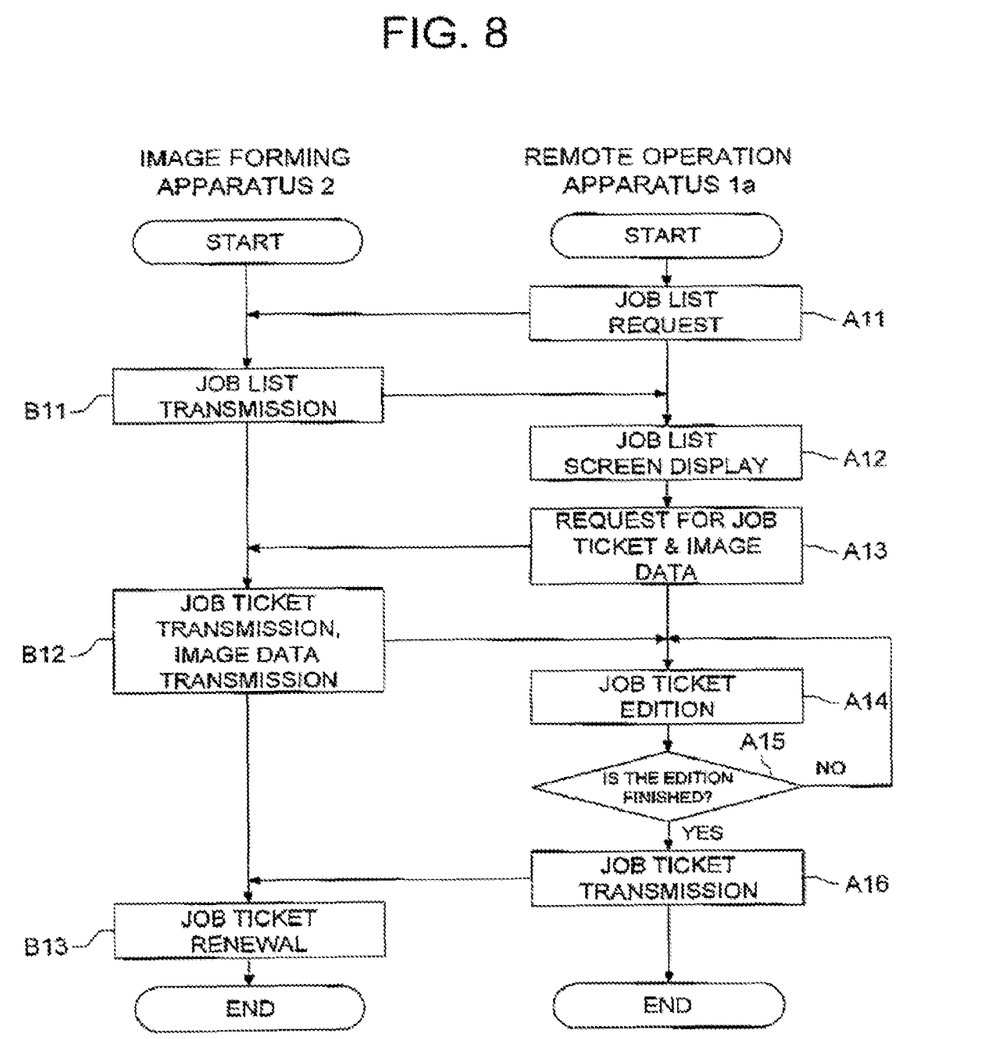
FIG. 8 is a figure showing a flowchart describing the job ticket editing operations in the second preferred embodiment of the present invention.

Next, the job ticket editing operation of the image forming system 100a is described referring to the flow chart shown in FIG. 8.

The job ticket editing operations described here consist of the different operations of Steps A11 to A16 carried out by the control section 11 of the remote control apparatus 1a, and the different operations of Steps B11 to B16 carried out by the control section 21 of the image forming apparatus 2.

Firstly, in the remote control apparatus 1a, the request by the user for the job list is received from the operation section 13, and this job list request is transmitted to the image forming apparatus 2 (Step A11).

In the image forming apparatus 2, in answer to the above job list request sent from the remote control apparatus la, a job list of the image forming jobs stored in the memory section 27 is prepared, and this job list is transmitted to the remote control apparatus 1 (Step B11).

After Step B11, in the remote control apparatus la, the above job list (see the example of display of a job list shown in FIG. 5) received from the image forming apparatus 2 is displayed (Step A12) in the display section 12 and the user is prompted to enter the selection of the image forming job.

Next, in the remote control apparatus la, an instruction of requesting for the job ticket and image data of the selected image forming job is transmitted to the image forming apparatus 2 (Step A13).

After Step A13, in the image forming apparatus 2, in response to the instruction from said remote control apparatus 1a of requesting for the job ticket and image data, the image data corresponding to that job ticket is transmitted to the remote control apparatus 1a along with the job ticket (Step B12).

After step B12, in the remote control apparatus 1a, the thumbnail image is prepared based on the image data sent from said image forming apparatus 1a, and based on that thumbnail image and the job ticket, the output result template image is prepared that shows the final output result after post-processing made in accordance with the instructions of editing the job ticket input from the operation section 13, and the job ticket editing screen (see the display examples K1 to K4 shown in FIG. 6) is displayed in the display section 12 using the so prepared output result template image (Step A14).

After Step A14, in the remote control apparatus la, the judgment will be made (Step A15) of whether or not the user has indicated the end of job ticket editing, and when the end indication has been made (Step A15: Yes), the edited job ticket and the corresponding end indication are transmitted (Step A16) to the image forming apparatus 2, and in the image forming apparatus 2, the job ticket stored in the memory section 27 is updated (Step B13) based on the job ticket that has been received.

In Step A15, if the end of editing specification has not been made (Step A15: No), the control gets transferred to Step A14 and the job ticket editing screen will be displayed again.

As has been described in the above paragraphs, in the image forming systems 100 and 100a, at the time of editing the job tickets of the image forming apparatus 2 from the remote control apparatuses 1 and 1a, the output result template image showing the final output result according to the editing instructions is prepared using the thumbnail of the image intended to be output, and the job ticket editing screen is displayed using this output result template image.

Furthermore, in the configuration of the image forming system 100a, for example, even if the image forming apparatus 2 is one that does not have the function of preparing the thumbnail of the image intended to be output, it is possible to realize this function by adding a remote control apparatus 1a that has said function.

As a result, since the user editing the job tickets of the image forming apparatus 2 from a remote control apparatus 1 or 1a, can easily verify the final output according to the editing instructions by referring to the output result template image displayed on the job ticket editing screen, the user will not have to predict in one's own mind the output result nor will have to directly confirm the final output result by actually executing the job in the image forming apparatus 2.

Further, the descriptions given above in the discussions on the preferred embodiments of the present invention are merely examples of the image forming system according to the present invention, and the spirit and intent of the present invention shall not be construed to be limited to these. For example, although the image forming system 100 in a preferred embodiment of the present invention was described as having an operational configuration in which the editing operation ends with one job ticket editing operation, the present invention shall not be limited to this operation configuration, but the image forming system 100 can have an operational configuration in which the operation returns to the display of the job list editing screen.

What is claimed is:

1. A control method for controlling an image forming system comprising a remote operation apparatus connected to a network and an image forming apparatus which is operable remotely by the remote operation apparatus via the network, the control method comprising:

storing in the image forming apparatus an image forming job containing output image data and a job ticket;

transmitting a job list from the image forming apparatus to the remote operation apparatus;

subsequently transmitting, from the image forming apparatus to the remote operation apparatus, the output image data and the job ticket, corresponding to a job requested from the remote operation apparatus;

editing in the remote operation apparatus the job ticket in accordance with a request inputted in the remote operation apparatus;

generating in the remote operation apparatus a thumbnail based on the output image data transmitted by the image forming apparatus;

generating in the remote operation apparatus an output template image representing an output of an image forming processing performed based on the edited job ticket and the thumbnail; and displaying the output template image on a display section of the remote operation apparatus.

2. An image forming system comprising:

an image forming apparatus for forming an image; and a remote operation apparatus which remotely operates the image forming apparatus via a network;

wherein the image forming apparatus comprises:

a memory section which stores a job comprising output image data of an output subject and a job ticket;

a first controller which controls transmission of the output image data and the job ticket to the remote operation apparatus via a first interface section;

wherein the remote operation apparatus comprises:

a second interface section;

an image processing section which generates a thumbnail of the image based on output image data received from the image forming apparatus;

a display section; and a second controller which controls reception by the remote operation apparatus of the output image data and the job ticket transmitted from the image forming apparatus via the second interface section, and which edits the job ticket in accordance with a request inputted in the remote operation apparatus, and generates an output template image representing an output of an image forming processing performed based on the edited job ticket and the thumbnail generated by the image processing section, and which controls display of the output template image on the display section; and wherein the first controller controls transmission of a job list to the remote operation apparatus, and controls transmission of the output image data and the job ticket corresponding to a job requested from the remote operation apparatus to the remote operation apparatus, and wherein the job list is transmitted to the remote operation apparatus before the transmission of the output image data and the job ticket to the remote operation apparatus.

\* \* \* \* \*